United States Patent [15] 3,636,466
Mossberg et al. [45] Jan. 18, 1972

[54] BUILDING BLOCK FOR ACTIVE RC FILTERS

[72] Inventors: Kare Hjovard Mossberg, Akersberga; Dag E:son Akerberg, Stockholm, both of Sweden

[73] Assignee: Telefonaktiebolaget L.M. Ericsson, Stockholm, Sweden

[22] Filed: Feb. 25, 1970

[21] Appl. No.: 13,955

[30] Foreign Application Priority Data

Mar. 11, 1969 Sweden..................................3328/69

[52] U.S. Cl..................................330/85, 330/107, 330/126
[51] Int. Cl..........................................................H03f 1/36
[58] Field of Search................330/21, 31, 85, 126, 107, 109; 333/70 CR; 307/295

[56] References Cited

OTHER PUBLICATIONS

Salerno, " Active Filters: Part 7 Analog Blocks Ensure Stable Design," Electronics, Feb. 17, 1969, pp. 100- 105
Muir et al., " Design of Active RC Filters Using Operational Amplifiers," Systems Technology, Apr. 1968, pp. 18- 30

*Primary Examiner*—Roy Lake
*Assistant Examiner*—James B. Mullins
*Attorney*—Hane & Baxley

[57] ABSTRACT

A building block for active RC filters including three amplifiers. The output of one amplifier is connected to the input of another amplifier via an impedance. Furthermore, the output of one amplifier is connected to the output terminal of the building block. The inputs of the amplifiers are each via an impedance connected to the input terminal of the building block and via another impedance to the output terminal. Because of the fact that the impedances between the in- and output terminals and the inputs of the amplifiers are triamble, the zeros and the poles of the transfer function can be arbitrarily located in the complex *s* plane.

10 Claims, 6 Drawing Figures

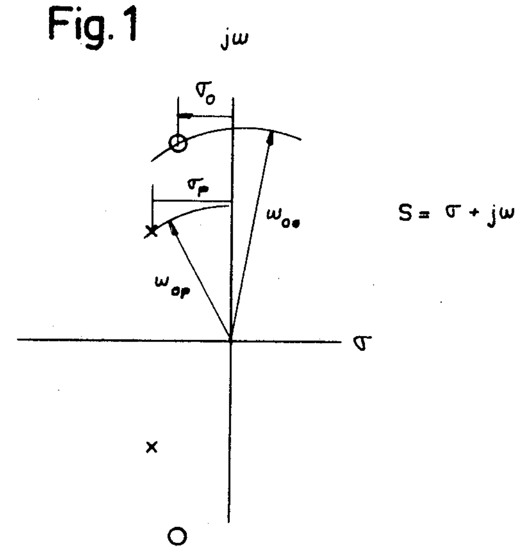
Fig. 1
Fig. 2
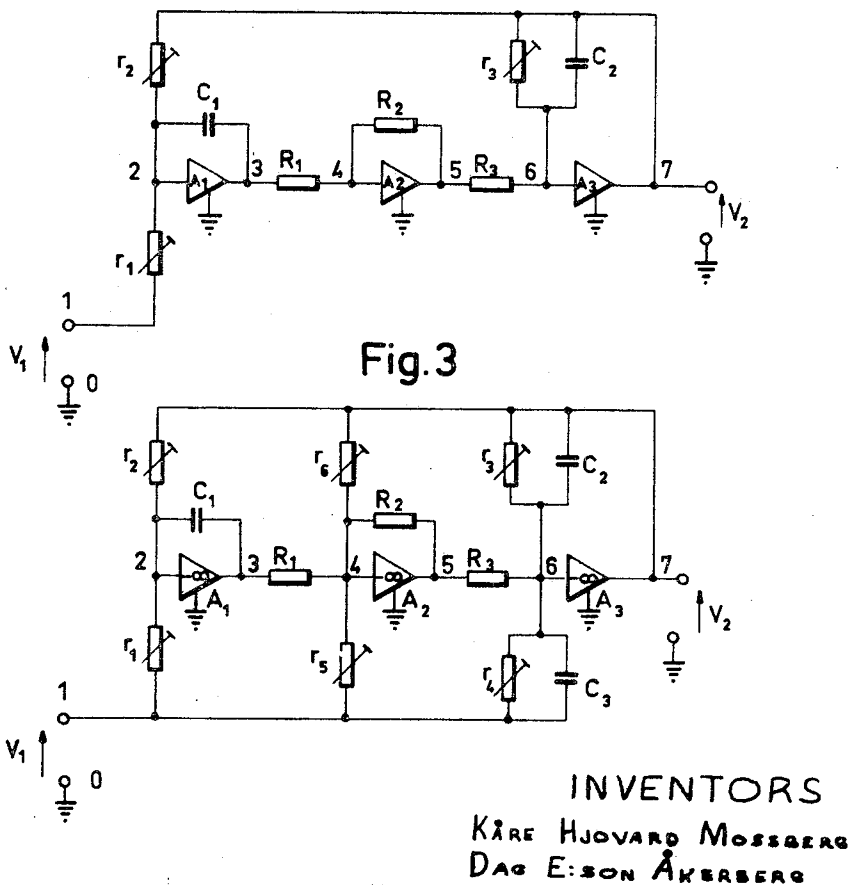
Fig. 2, Fig. 3
INVENTORS
KÅRE HJOVARD MOSSBERG
DAG E:SON ÅKERBERG
BY Hane and Baxley
ATTORNEYS

INVENTORS
KÅRE HJOVARD MOSSBERG
DAG E:SON ÅKERBERG

BY Hane and Baxley
ATTORNEYS

BUILDING BLOCK FOR ACTIVE RC FILTERS

The present invention relates to a building block for active RC filters.

The progress within the integrated electronics has made it possible to produce very compact and reliable electronic circuits. This technique is not applicable to conventional RLC filters, but, however, well adapted for active RC filters.

A general building block for active RC filters realizes the voltage transfer function:

$$\frac{V_2(s)}{V_1(s)}=H(s)=K\frac{s^2+2\sigma_0 s+\omega^2_{00}}{s^2+2\sigma_p s+\omega^2_{0p}} \quad (1)$$

where $H(s)$ characterizes its poles and zeros and $K$ is a constant. (see FIG. 1)

By cascade connection of several such building blocks it is possible to realize each filter function which can be obtained by conventional passive RLC networks.

Up until now known realizations of a building block according to the equation (1) have been marred by weak points which have not made them so attractive. Balanced networks have been used, or a network which realizes the poles has been completed with zeros by connecting parts of the input voltage to different points in the network—i.e., feed forward which often demands a phase shifter. Alternately voltages from different parts in the network can be added with suitable weighing factors in an extra amplifier. Many of these realizing methods of the equation (1) have great sensitivities to component variations, and they all demand a complicated trimming procedure as the different coefficients in the equation (1) cannot be adjusted independent of each other.

An object of the present invention is to realize a building block which has low sensitivities to variations of its active and passive components and moderate spreading in the component values and is easy to trim.

The building block according to the invention includes a basic network known per se with three amplifiers and two capacitors and with a defined voltage transfer function in the complex $s$ plane which realizes a complex couple of poles and is of the type:

$$H(s)=K\cdot\frac{1}{s^2+2\sigma_p s+\omega^2_{0p}} \quad (2)$$

The basic network is described in A. J. L. Muir, A. E. Robinson: "Design of active RC filters using operation amplifiers", System Technology, Apr. 1968, p. 22, FIG. 9.

The circuits which are included in the building block according to the invention, have the lowest known sensitivities to variations in passive and active components. It need not include more than 3 capacitors, but its greatest advantage is that it is outstandingly easy to trim. For each $\sigma_p$, $\omega_{0p}$, $\sigma_0$ and $\omega_{00}$ only one resistor is trimmed and these are trimmed independent of each other.

The object of a building block according to the invention is realized mainly by connecting one or several components in the basic network, whereby a voltage transfer function of the type:

$$H(s)=K\frac{s^2+2\sigma_0 s+\omega^2_{00}}{s^2+2\sigma_p s+\omega^2_{0p}}$$

is realized, where for example $$\sigma_0=\frac{1}{2}\left(\frac{1}{r_4}-\frac{R_2}{r_5R_3}\right)\frac{1}{C_3};$$

$$\omega_{00}^2=\frac{R_2}{r_1R_1R_3C_1C_3};$$

$$\sigma_p=\frac{1}{2}\left(\frac{1}{r_3}-\frac{R_2}{r_6R_3}\right)\frac{1}{C_2};$$

$$\omega_{0p}^2=\frac{R_2}{r_2R_1R_3C_1C_2};$$

and $$K=-\frac{C_3}{C_2}$$

which components on one hand may consist of one or more resistors ($r_4$, $r_5$) and/or one or more capacitors $c_3$, $c_5$), arranged between inputs of the amplifiers and the input terminal of the network, whereby two arbitrarily located zeros of the transfer function are obtained, and on the other hand may consist of a resistor ($r_6$) and/or a capacitor ($c_4$), arranged between inputs of the amplifiers and the output terminal of the network whereby the poles of the transfer function can be moved towards the right half of the complex plane. These components can also compensate losses in the capacitors $c_1$ and $c_2$ of the basic network.

Some building blocks, chosen as examples according to the invention, are described below in greater detail with reference to the accompanying drawings where:

FIG. 1 shows a complex $s$ plane with arbitrarily located poles and zeros;

FIG. 2 shows a circuit diagram of a basic network, on which the building block according to the invention is built;

FIG. 3–6 show different circuit diagrams of the building block according to the invention.

Figures 4, 5, 6:
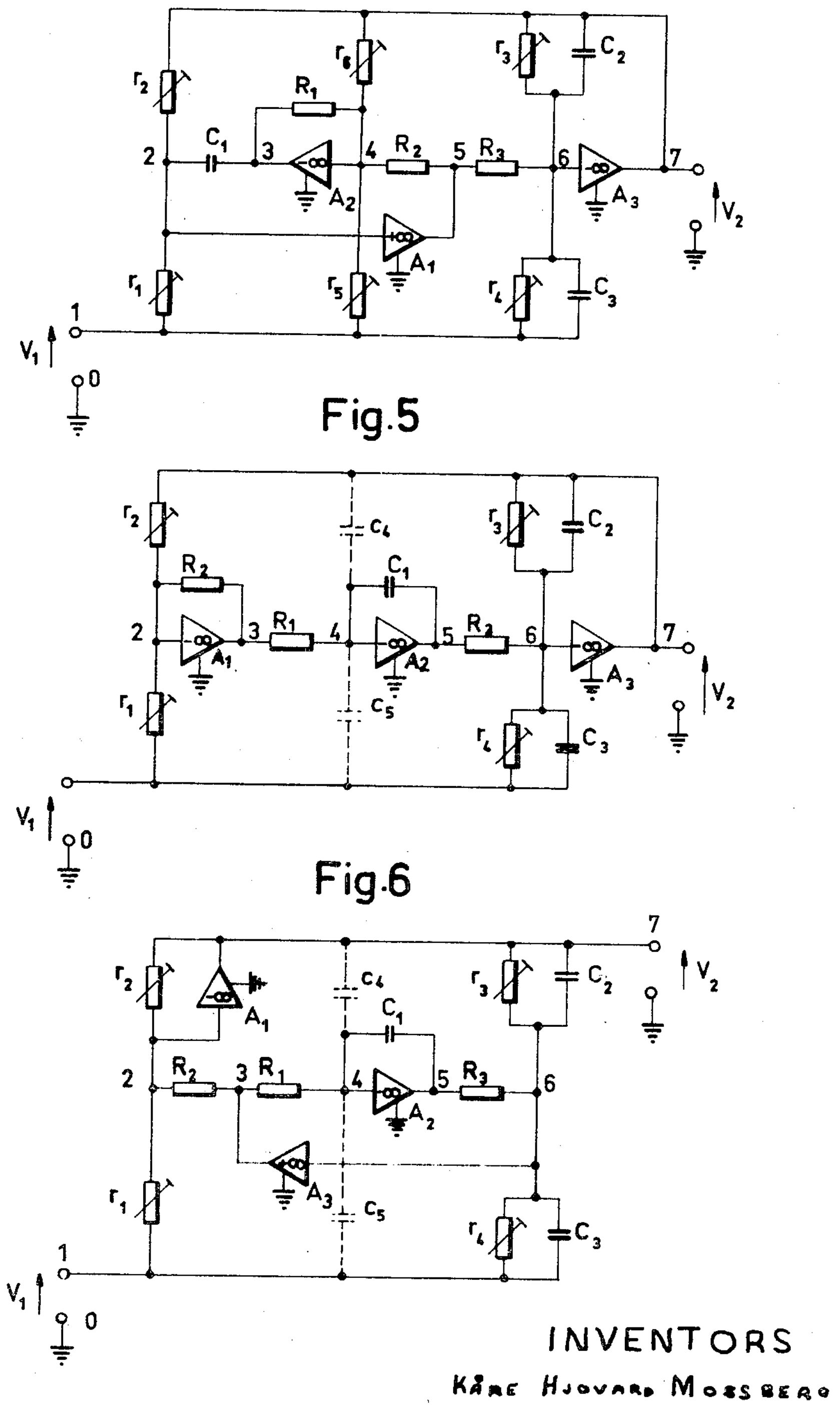

Detailed sensitivity and trimming analysis of networks which realize a couple of poles, has shown that the chosen network, according to FIG. 2, is outstanding among known methods to realize the equation (2).

The basic network according to FIG. 2 is constructed around three amplifiers with high negative amplification (theoretically −∞). The amplifiers have a high input impedance and a low output impedance relative the impedance level in the remainder of the circuit. The basic network has an input terminal 1 and an output terminal 7. The input voltage $V_1$ is received across the input terminal 1 and a reference point 0 and the output voltage $V_2$ is transmitted across the output terminal 7 and the said reference point. The input 2 of the first amplifier $A_1$ is connected to the input terminal 1 of the basic network via a resistor or resistance $r_1$ and to the output terminal 7 of the basic network via another resistance $r_2$. The output 3 of this amplifier is connected to the input 4 of the second amplifier $A_2$ via a resistance $R_1$ and the output 5 of this second amplifier is connected to the input 6 of the third amplifier $A_3$ via a resistance $R_3$. The input of the third amplifier is moreover connected to the output terminal 7 of the basic network via a capacitor $C_2$ which is connected in parallel to a resistance $r_3$. The output of this third amplifier is connected to the output terminal 7 of the basic network. The input 2 and the output 3 of the first amplifier $A_1$ are connected to each other via a capacitor $C_1$ and the input 4 and output 5 of the second amplifier are connected to each other via a resistance $R_2$.

The transfer function for the network in FIG. 2 is $$H(s)=K\frac{1}{s^2+2\sigma_p s+\omega_{0p}^2}=-\frac{R_2}{r_1R_1R_3C_1C_2}\cdot\frac{1}{s^2+s\frac{1}{r_3C_2}+\frac{R_2}{r_2R_1R_3C_1C_2}} \quad (3)$$

The addition of complex zeros is made by connecting the input 6 of the third amplifier $A_3$ to the input terminal 1 of the basic network via a capacitor $C_3$. In order to be able to place optionally the zeros, this capacitor $C_3$ is connected in parallel to a resistance $r_4$ and the input terminal 1 of the basic network is connected to the input 4 of the second amplifier $A_2$ via a resistance $r_5$. See FIG. 3.

The transfer function will then be:

$$H(s)=K\frac{s^2+2\sigma_0 s+\omega_{00}^2}{s^2+2\sigma_p s+\omega_{0p}^2}=-\frac{C_3}{C_2}\cdot\frac{s^2+s\left(\frac{1}{r_4}-\frac{R_2}{r_5R_3}\right)\frac{1}{C_3}+\frac{R_2}{r_1R_1R_3C_1C_3}}{s^2+s\frac{1}{r_3C_2}+\frac{R_2}{r_2R_1R_3C_1C_2}} \quad (4)$$

As appears from the formulas the resistance $r_1$ is included as a parameter only in $\omega_{00}$, the resistance $r_2$ only in $\omega_{0p}$, the resistance $r_3$ only in $\sigma_p$ and the resistances $r_4$ and $r_5$ only in $\sigma_0$. Independent trimming of desired transfer function can be made by the resistances $r_1$–$r_5$, consequently, the values of the capacitors $C_1$–$C_3$ and the remaining resistances $R_1$–$R_3$ not need to be controlled particularly carefully. Hence, standard values can be chosen.

All the resistances and capacitors are normally not connected simultaneously.

In the same manner as a resistance $r_5$ between the input 4 of the second amplifier $A_2$ and the input terminal 1 of the building block moves the zeros into the right half plane, a resistance $r_6$ between the input of this amplifier and the output terminal 7 of the basic network will give $$\sigma_p=\frac{1}{2C_2}\left(\frac{1}{r_3}-\frac{R_2}{R_3r_6}\right) \qquad (5)$$

whereby the poles are moved towards the right half plane.

A possible application of the resistance $r_6$ is for compensation of losses in the capacitors $C_1$ and $C_2$.

Theoretically the inputs of the amplifiers $A_1$, $A_2$ and $A_3$ can arbitrarily be shifted with each other, without the transfer function (4) being changed. In practice, however, with the exception of the network according to FIG. 3, only the variant according to FIG. 4 stable. In this coupling the amplifiers $A_2$ and $A_3$ have negative amplification while the amplifier $A_1$ has positive amplification.

For the cases when the resistances $r_5$ and $r_6$ are not connected, the capacitor $C_1$ and the resistance $R_2$ can change places in the network according to FIG. 3 without the transfer function (4) being changed which gives the network according to FIG. 5. Also here the amplification inputs can arbitrarily be shifted and in practice a stable variant is obtained according to FIG. 6. In this coupling the amplifiers $A_1$ and $A_2$ have negative amplification while the amplifier $A_3$ has positive amplification.

A study of the FIGS. indicates that the only difference between FIGS. 3 and 4 is that the first and the second amplifier have shifted outputs. Moreover, there is indicated that in the coupling examples according to FIGS. 3 and 4 the resistances $r_4$ and $r_5$ can be omitted. Consequently, the zeros of the transfer function will be located on the imaginary axle of the complex $s$ plane. If only the resistance $r_4$ is omitted, the zeros will be located in the right half plane and if only the resistance $r_5$ is omitted the zeros will be located in the left half plane. By varying these resistances together with the resistance $r_1$, the zeros can be placed in the whole $s$ plane. By connecting the input 4 of the amplifier $A_2$ with the output terminal 7 of the building block via a resistance $r_6$ the poles are moved towards the right half plane. The poles can also, by trimming the resistance $r_6$, be moved into the right half plane, whereby, however, the coupling becomes unstable. Besides the poles can be moved by means of the resistances $r_2$ and $r_3$.

FIG. 6 is obtained from FIG. 5 by shifting the inputs of the first and third amplifier $A_1$ and $A_3$ respectively. In the coupling examples according to FIGS. 5 and 6 the poles and zeros can be moved, in the same manner as is above described in connection with FIGS. 3 and 4, by means of the resistances $r_1$–$r_4$ while the resistances $r_5$ and $r_6$ in FIGS. 3 and 4 are each replaced by a capacitor $c_5$ and $c_4$ connected between the input 4 of the amplifier $A_2$ and the input terminal 1 of the building block respectively between the input 4 of the same amplifier and the output terminal 7 of the building block.

Without these two capacitors $c_4$ and $c_5$ the poles and the zeros in the coupling examples according to FIGS. 5 and 6 are limited to the left complex half plane, the imaginary axis included.

If on the contrary these two capacitors $c_4$ and $c_5$ are connected in the coupling examples $\sigma_p$ and $\sigma_0$ are changed to $$\sigma_p=\frac{1}{2}\left(\frac{1}{r_3}-\frac{c_4}{C_1R_3}\right)\frac{1}{C_2}$$

$$\sigma_0=\frac{1}{2}\left(\frac{1}{r_4}-\frac{c_5}{C_1R_3}\right)\frac{1}{C_3}$$

If zeros are desired in the right half plane, it is better in practice, however, to utilize any of the networks according to FIG. 3 or FIG. 4, as these do not demand extra capacitors, since capacitors are more expensive than resistances and more difficult to trim.

Efforts in practice have confirmed that the active RC filters constructed with the above-described blocks are very easy to estimate and trim.

We claim:

1. A building block for active RC filters having a basic network comprising an input terminal, an output terminal, first, second and third amplifiers, a first impedance connecting the input of said first amplifier to said input terminal, a second impedance connecting the input of said first amplifier to said output terminal, a third impedance consisting of a first resistor and a first capacitor connecting the input of said third amplifier to said output terminal, a fourth impedance consisting of a second resistor and a second capacitor connecting the input of said third amplifier to said input terminal, means for connecting the output of said first amplifier to the input of said second amplifier, means for connecting the output of said second amplifier to the input of said third amplifier, and means for connecting the output of said third amplifier to said output terminal.

2. The building block of claim 1 further comprising a third capacitor connecting said input terminal to the output of said first amplifier.

3. The building block of claim 2 further comprising a fifth impedance connecting the input of said second amplifier to said input terminal and a sixth impedance connecting the input of said second amplifier to said output terminal.

4. The building block of claim 1 further comprising a third capacitor connecting the input of said second amplifier to the output of said second amplifier.

5. The building block of claim 4 further comprising a fifth impedance connecting the input of said second amplifier to said input terminal and a sixth impedance connecting the input of said second amplifier to said output terminal.

6. The building block of claim 5 wherein said fifth and sixth impedances include capacitors.

7. A building block for active RC filters having a basic network comprising an input terminal, an output terminal, first, second and third amplifiers, a first impedance connecting the input of said first amplifier to said input terminal, a second impedance connecting the input of said first amplifier to said output terminal, a third impedance consisting of a first resistor and a first capacitor connecting the input of said third amplifier to said output terminal, a fourth impedance consisting of a second resistor and a second capacitor connecting the input of said third amplifier to said input terminal, means for connecting the output of said first amplifier to the inputs of said second and third amplifiers, a third capacitor connecting the output of said second amplifier to the input of said first amplifier, a third resistor connecting the input to the output of said second amplifier, and means for connecting the output of said third amplifier to said output terminal.

8. The building block of claim 7 further comprising a fifth impedance connecting the input of said second amplifier to said input terminal and a sixth impedance connecting the input of said second amplifier to said output terminal.

9. A building block for active RC filters having a basic network comprising an input terminal, an output terminal, first, second and third amplifiers, a first impedance connecting the input of said first amplifier to said input terminal, a second impedance connecting the input of said first amplifier to said output terminal, a third impedance consisting of a first resistor and a first capacitor connecting the inpUT OF said third amplifier to said output terminal, a fourth impedance consisting of a second resistor and a second capacitor connecting the input of said third amplifier to said input terminal, means for connecting the output of said first amplifier to said output terminal, means for connecting the output of said second amplifier to input of said third amplifier, means for connecting the output of said third amplifier to the inputs of said first and second amplifiers, and a third capacitor connecting the input to the output of said second amplifier.

10. The building block of claim 9 further comprising a fifth impedance connecting the input of said second amplifier to said input terminal and a sixth impedance connecting the input of said second amplifier to said output terminal.

* * * * *